United States Patent [19]

Ayama et al.

[11] Patent Number: 5,196,387
[45] Date of Patent: Mar. 23, 1993

[54] CERAMIC COMPOSITION AND A PROCESS FOR PRODUCING THE SAME

[75] Inventors: Kouichi Ayama, Minamata; Kaneo Noake, Yokohama, both of Japan

[73] Assignee: Chisso Corporation, Osaka, Japan

[21] Appl. No.: 706,033

[22] Filed: May 28, 1991

[30] Foreign Application Priority Data

May 29, 1990 [JP] Japan .................................. 2-139283

[51] Int. Cl.⁵ ............................................. C04B 35/10
[52] U.S. Cl. ...................................... 501/89; 501/97;
501/98; 525/28; 525/43
[58] Field of Search ....................... 501/88, 89, 97, 98;
525/28, 43

[56] References Cited

U.S. PATENT DOCUMENTS

| 4,757,035 | 7/1988 | Baney et al. | 501/92 X |
| 4,845,061 | 7/1989 | Inoguchi et al. | 501/98 X |
| 4,869,854 | 9/1989 | Takeda et al. | 501/97 X |
| 4,962,069 | 10/1990 | Burns et al. | 501/92 X |
| 5,080,844 | 1/1992 | Su | 501/97 X |
| 5,081,078 | 1/1992 | Petzow et al. | 501/98 X |

Primary Examiner—Karl Group
Attorney, Agent, or Firm—Leydig, Voit & Mayer

[57] ABSTRACT

A novel ceramic composition having high strength at high temperatures and needing no degreasing step before its sintering step, and a process for producing the same are provided,
which composition is obtained by calcining a molded body composed of alumina powder and a polysilazane in an inert gas such as nitrogen, argon, etc. and/or ammonia, or under pressure and at 800°-1950° C.
the polysilazane including the following:
a polysilazane (i) having a core structure consisting of repetitive units of

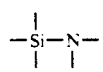

and comprising the residual groups of the precursor of (i) having

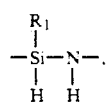

and partly forming structural units of

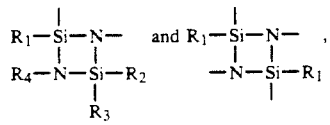

the structural units being bonded to each other,
a polysilazane (ii) having the above core structure and comprising the residual groups of the precursor of (ii) consisting of repetitive units of

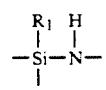

being bonded by a structural unit of

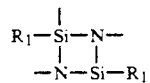

to each other, and the precursor being composed of units of

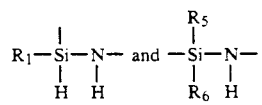

wherein; and
a polysilazane (iii) having the above core structure and comprising the residual groups of the precursor of (iii), partly forming structural units of

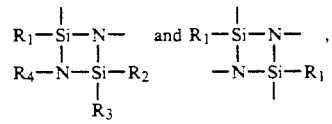

these units being bonded to each other, and the precursor being composed of units of

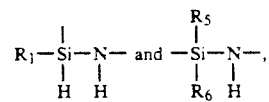

wherein $R_1$, $R_2$, $R_3$, $R_4$, $R_5$ and $R_6$ which may be the same or different, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsily group, and $R_1$, $R_2$ and $R_3$ each represent a hydrogen atom or a di-lower alkylamino group.

16 Claims, No Drawings

CERAMIC COMPOSITION AND A PROCESS FOR PRODUCING THE SAME

BACKGROUND OF THE INVENTION

1. Field of the Invention

This invention relates to a novel ceramic composition having a ulterior strength at high temperatures, a process for producing the same and a molding auxiliary.

2. Description of the Related Art

Aluminous ceramics are high strength ceramics having currently most advanced use applications and also one kind of ceramics having superior mechanical strength, resistance to abrasion and chemically resistant stability and also are expected to have more extended use applications.

Aluminous ceramics are well known in that they are superior in heat resistance and mechanical strength to other materials, but have a drawback in the aspect of moldability. Aluminous ceramics, too, are not exceptional in the above fact. Thus, in order to impart moldability to ceramic power and cause the resulting molded body to have strength, molding auxiliaries have been needed.

According to the prior art, polyvinyl butyral, polyvinyl alcohol and the like have been used as a molding auxiliary for the ceramic powder, and a release agent, a deflocculant and the like have been added thereto. The quantity of these molding auxiliaries used varies depending upon the molding process or technique, but in general, there is a tendency that the more complicated the shape of the resulting molded product, the greater the quantity of the molding auxiliary used.

Further, it is necessary for the product molded when using the auxiliary, to remove the used molding auxiliary in advance of its sintering, and in general, removal by thermal decomposition, referred to as degreasing is applied. As to the degreasing step, the more the quantity of the binder used and the more complicated the shape of the resulting molded product, the longer is the step required. Further, faults such as bulges, cracks, etc. occur very often.

Further, aluminous ceramics have superior mechanical strength and have been expected to be useful as a structural material, as described above. However, in recent years, a material having high strengths at high temperatures has been required, and actually, more expensive silicon nitride, silicon carbide and further, composite materials have been sought as the material. Aluminous ceramics have a high strength at room temperature, but they exhibit notable reduction in the strength at 1,000° C. or higher and the strength at 1,200° C. is reduced about ½ to ¼ the strength at room temperature.

SUMMARY OF THE INVENTION

In view of the above actual status, the present inventors have made extensive research, and as a result have found a novel ceramic composition having a high strength at high temperatures, without needing a degreasing step and using a cheap aluminous raw material.

The present invention has the following constitutions (1) to (8):

(1) A process for producing a ceramic composition, which comprises calcining a molded body composed of alumina powder and a polysilazane in an atmosphere of an inert gas and/or ammonia or at an elevated pressure at a temperature of 800° to 1,950° C. (2) A process according to item (1), wherein said inert gas is nitrogen or argon. (3) A process according to item (1), wherein said polysilazane is a polysilazane (i) which has a core-structure consisting of repetitive units of the formula

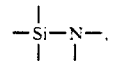

and comprises a plurality of the residual groups of the precursor of the polysilazane (i), having the formula

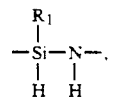

the residual groups partly forming a structural unit of the formula

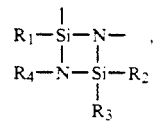

and partly forming a structural unit of the formula

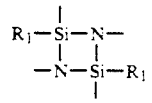

and these structural units being bonded to each other in the polysilazane (i), wherein $R_1$, $R_2$, $R_3$ and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri- lower alkyl- or di- lower alkylsilyl group $R_1$, $R_2$ and $R_3$ each may represent a hydrogen atom; or a di- lower alkylamino group, and $R_1$, $R_2$, $R_3$ and $R_4$ may be the same or different.

(4) A process according to item (2), wherein the lower alkyl group is selected from among a methyl group, ethyl group, n-propyl group and isopropyl group; the substituted or unsubstituted lower aryl group is selected from among phenyl group, tolyl group and xylyl groups; the tri- lower alkyl- or di- lower alkylsilyl group is selected from among trimethyl-, dimethyl-, methylethyl-and triethyl- silyl groups; and the di- lower alkylamino group is selected from among dimethyl-, diethyl-, methylethyl- and diisopropyl- amino groups.

(5) A process according to item (1), wherein the polysilazane is a polysilazane (ii) which has a core structure consisting of repetitive units of the formula

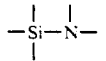

the residual groups of the precursor of the polysilazane (ii) consisting of the repetitive units of the formula

being bonded by a structural unit of the formula

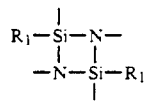

to each other, and the precursor being composed of the units of the formula

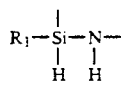

and the formula

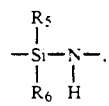

wherein the $R_1$, $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri- lower alkyl- or di-lower alkylsilyl group or a di- lower alkylamino group, $R_1$ also represents hydrogen atom besides the above-mentioned groups, and $R_1$, $R_5$ and $R_6$ may be the same or different.

(6) A process according to item (5), wherein the lower alkyl group is selected from among methyl group, ethyl group, n-propyl group and isopropyl group; the substituted or unsubstituted lower aryl group is selected from among phenyl group, tolyl group and xylyl groups; the tri- lower alkyl- or di- lower alkylsilyl group is selected from among trimethyl-, dimethyl-, methylethyl and triethyl- silyl groups; and the di- lower alkylamino group is selected from among dimethyl-, methylethyl- and diisopropyl-amino groups.

(7) A process according to item (1), wherein the polysilazane is a polysilazane (iii) which has a core structure consisting of repetitive units of the formula

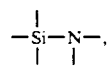

and comprises a plurality of the residual groups of the precursor of the polysilazane (iii), having the formula

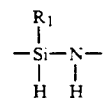

the residual partly forming a structural unit of the formula

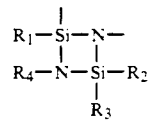

and partly forming a structural unit of the formula

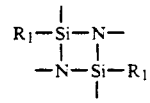

these structural units being bonded to each other in the polysilazane (iii), and further, the precursor being partly composed of units of the formula

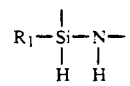

and the formula

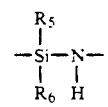

wherein $R_1$, $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri- lower alkyl- or di- lower alkylsilyl group or a di- lower alkylamino group, except that R: also represents a hydrogen atom besides the abovementioned groups, and $R_1$, $R_5$ and $R_6$ may be the same or different.

(8) A process according to item (7), wherein the lower alkyl group is selected from among a methyl group, ethyl group, n-propyl group and isopropyl group; the substituted or unsubstituted lower aryl group is selected from among phenyl group, tolyl group and xylyl groups; said tri- lower alkyl- or di- lower alkylsilyl group is selected from among trimethyl-, dimethyl-, methylethyl- and triethyl- silyl groups; and the di- lower alkylamino group is selected from among dimethyl-, methylethyl- and diisopropyl- amino groups.

(9) A novel ceramic composition obtained by sintering and molding a molded body consisting of alumina powder and a polysilazane which forms silicon nitride, silicon carbide, sialon or a mixture thereof in an atmosphere of nitrogen, argon and/or ammonia or under pressure, at a temperature of 800° to 1,950° C.

(10) A novel ceramic composition according to item (9), wherein the polysilazane is a polysilazane (i) as set forth in item (3).

(11) A novel ceramic composition according to item (9), wherein the polysilazane is a polysilazane (ii) as set forth in item (5).

(12) A novel ceramic composition according to item (9), wherein said polysilazane is a polysilazane (iii) as set forth in item (7).

(13) A molding auxiliary for a novel ceramic composition which is characterized by being kneaded together with alumina powder, and subjected to molding, the auxiliary being a polysilazane which forms silicon nitride, silicon carbide sialon or a mixture of the foregoing in an atmosphere of nitrogen and/or ammonia or under pressure and in a calcination atmosphere at 800° to 1,950° C.

(14) A molding auxiliary according to item (13), wherein the molding is carried out according to a thermoplastic molding process, mud-casting molding process or pressed powder molding process.

(15) A molding auxiliary according to item (13), wherein the polysilazane is a polysilazane (i) as set forth in item (3).

(16) A molding auxiliary according to item (13), wherein the polysilazane is a polysilazane (ii) as set forth in item (5).

(17) A molding auxiliary according to item (13), wherein the polysilazane is a polysilazane (iii) as set forth in item (7).

DETAILED DESCRIPTION OF PREFERRED EMBODIMENT

The present invention is directed to a process for producing a ceramic composition characterized by kneading alumina powder together with a polysilazane which forms silicon nitride, silicon carbide, sialon (a general term of oxygen-nitrogen oxide expressed by the formula $(Si,Al)_3(O,N)_4$) or a mixture of the foregoing in an atmosphere of an inert gas such as argon or nitrogen and/or ammonia or under pressure at a sintering temperature of 800° to 1,950° C., to form a molded body, and calcining the molded body. Such a polysilazane includes those shown by the above-mentioned (i), (ii) or (iii).

Further, the present invention is directed to a ceramic composition characterized by kneading alumina powder together with a polysilazane which forms silicon nitride, silicon carbide, sialon or a mixture of the foregoing in an atmosphere of an inert gas such as argon or nitrogen and/or ammonia or under pressure at a sintering temperature of 800° to 1,950° C., to form a molded product, and calcining the molded product to obtain the above composition. Such a polysilazane used in this case includes at least one of those shown by the above-mentioned (i), (ii) or (iii).

Furthermore, the present invention is directed to a molding auxiliary for a ceramic composition which is kneaded together with alumina powder and used for effecting production of the ceramic composition without any degreasing step, which auxiliary is a polysilazane which forms silicon nitride, silicon carbide, sialon or a mixture of the foregoing, when the polysilazane is kneaded together with alumina powder in an atmosphere of an inert gas such as nitrogen or argon and/or ammonia or under pressure, at a calcination temperature of 800° to 1,950° C.

In this case, too, the polysilazane includes at least one of those shown by the above-mentioned (i), (ii) or (iii).

When such a polysilazane is kneaded together with alumina powder as a molding auxiliary, it is possible to obtain an aluminous ceramic having a superior moldability and a sufficient strength for molded bodies imparted thereby, without needing any degreasing step and having high strengths at high temperatures.

The above polysilazane is calcined in the presence of alumina powder in an atmosphere of nitrogen and/or ammonia at a temperature of 800° to 1,950° C. to form silicon nitride, silicon carbide or sialon with a high yield so that degreasing after molding as in the case of organic molding auxiliaries conventionally used is unnecessary, and the quantity of gas generated by decomposition and gasification during the calcination is so small that faults such as bulges, cracks, etc. hardly occur.

Further, since the polysilazane remains in the form of silicon nitride, silicon carbide, sialon or a mixture of the foregoing in the resulting molded body, calcination of such a molded body affords a ceramic in the form of a composite substance of alumina with silicon nitride, silicon carbide, sialon or a mixture of the foregoing.

In addition, in conducting the present invention, it goes without saying that nitrogen and/or ammonia may be mixed with an inert gas such as argon, helium, etc., as the reaction atmosphere.

Further, the polysilazane in the present invention is provided with such properties together as being soluble in organic solvents as in the case of general organic high-molecular substances, and being softened on heating; it is possible to produce a sintered body according to conventional molding processes such as extrusion molding, injection molding, mud-casting molding, doctor blade, etc., without degreasing step, and as to the thus obtained ceramic, intense reduction in the strength at high temperatures as in the case of general aluminous ceramics is not observed, resulting in a ceramic having a high strength at high temperatures. The alumina powder used as the main agent in the reaction may be those conventionally used, but those of small particles and uniform particle diameter are preferred. The temperature-raising rate at the time of the calcination is preferred to be 5° C./min. or less up to 700° C. and 20° C./min. or less up to 1,950° C. The calcination temperature is 800° to 1,950° C., preferably 1,100° to 1,850° C.

The polysilazane used in the present invention is a polymer whose main chain core consists of Si and N, and its molecular form or molecular structure varies depending upon its preparation process and the ceramic yield varies. In the present invention, the polysilazanes mentioned below affording a high ceramic yield and being soft on heating are suitably usable. The quantity of the polysilazane of the present invention added varies depending upon the molding process and is about 1 to 65% by weight.

As to the process for producing the polysilazane used in the present invention, those used for the above-mentioned polysilazanes include the following:

For example, in the case of the polysilazane (i), anhydrous ammonia is reacted with an organodihalosilane $R_1SiHX_2$ in a solution to form a ring or linear silazane precursor mixture, by reacting a silazane of the formula

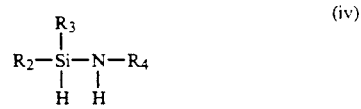

or a silylamine compound with the above resulting precursor mixture while making coexistent the silazane or silylamine in the precursor mixture, in the presence of a basic catalyst capable of removing hydrogen a atom (i.e. proton-removing) from the nitrogen atom adjacent to the silicon atom to effect dehydrogenation-cyclizationcrosslinking and thereby convert the precursor into a high-molecular compound. In the above formula R$_1$SiHX$_2$, X refers to a halogen atom such as Cl, Br, etc. (this applies to the subsequent descriptions).

Further, in the case of the polysilazane (ii), anhydrous ammonia is reacted with an organohalosilane mixture of R$_1$SiHX$_2$ with R$_5$R$_6$SiHX$_2$ in a solvent to form a ring or linear silazane precursor, followed by subjecting the precursor to proton-removal-cyclization-crosslinking and thereby obtain its polymer.

Further, in the case of the polysilazane (iii), anhydrous ammonia is reacted with an organohalosilane mixture of R$_1$SiHX$_2$ with R$_5$R$_6$SiHX$_2$ in a solvent to form a ring or linear silazane precursor, followed by reacting a silazane represented by the formula

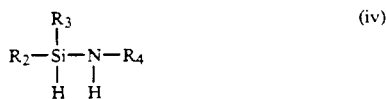

or a silylamine compound, with the precursor mixture while making coexisting the silazane or silylamine compound in the precursor mixture, in the presence of a basic catalyst capable of removing a hydrogen atom (i.e. proton-removing) from the nitrogen atom adjacent to the silicon atom to effect dehydrogenation-cyclization-crosslinking and thereby convert the precursor into a high-molecular compound.

The resulting product is preferred to have a content of the above group (iv) of 1 to 60% by mol, a content of R$_5$R$_6$SiX$_2$ of 1 to 60% by mol and a content of the total of the above group (iv) and R$_5$R$_6$SiX$_2$ of 2 to 60% by mol.

(Function and effectiveness)

In short, according to the present invention composed as described above, when the ceramic composition is molded using alumina powder, a polysilazane yielding silicon nitride, silicon carbide, sialon or a mixture of the foregoing, in an atmosphere of an inert gas such as nitrogen, argon, or the like or/and ammonia or in a state under pressure, and at a sintering temperature of 800° to 1,950° C., is kneaded as an auxiliary for molding. The above product is formed from the above polysilazane at the sintering step with a high yield; hence it is utterly unnecessary to remove the auxiliary by degreasing after the molding, as in the case of conventional organic molding auxiliaries; and also, the auxiliary remains as it is, in the molded product in the form of the above product; thus, faults such as cracks, bulges, etc. occurring by conventionally removing organic molding auxiliaries, scarcely occur.

Further, when the ceramic composition is molded using this polysilazane, generally employed molding processes may be employed such as those of thermoplastic molding, mud-casting process, press molding, doctor blade, etc. Furthermore, the above product from the above polysilazane remains in the resulting molded product, and the resulting ceramic composition is a composite body of alumina with silicon nitride, silicon carbide, sialon or a mixture of the foregoing, which composition does not cause intense reduction in the strength at high temperatures, as in the case of conventional aluminous ceramics.

The present invention will be described in more detail by way of Examples, but it should not be construed to be limited thereto.

EXAMPLE 1

An α-alumina powder (mean particle diameter: 0.4 μ, purity: 99.8%, AES-12, a tradename of a product made by Sumitomo Kagaku Co., Ltd.) and the polysilazane (ii) described above, wherein R$_1$, R$_5$ and R$_6$ each represent a methyl group, and having a number average molecular weight of 1,200, were kneaded under dispersing, in proportions shown in Table 1, followed by drying the resulting material in vacuo and grinding, to obtain a powder having the alumina powder and the polysilazane uniformly dispersed therein. The powder was placed in an iron mold of 50×60 mm, followed by subjecting it to uniaxial pressure molding under about 30 Kg/cm$^2$ and then to hydrostatic pressure press under 3,000 Kg/cm$^2$ to obtain a molded body.

As to its calcination, the temperature was raised up to 700° C. in a nitrogen atmosphere under 1 atm at a rate of 3C°/min., followed by raising the temperature up to 1,100° C. at a rate of 15C.°/min., further raising the temperature up to a final calcination temperature shown in Table 1 and raising the pressure up to 9.5 atm, further retaining the temperature and the pressure in this state for 2 hours and naturally cooling to obtain a sintered body. The density, flexural strength at room temperature and flexural strength at 1,200° C. of the 20 sintered body are shown in Table 1.

EXAMPLE 2

Example 1 was repeated except that an α-alumina powder (mean particle diameter: 0.4 μ, purity: 99.9%, AES-11E, a tradename of a product made by Sumitomo Kagaku Co., Ltd.) was used, to obtain the results shown in Table 1.

EXAMPLE 3

This Example was carried out under the same conditions as shown in Example 1 (2) of Table 1 except that the pressure at the time of sintering was always retained at 1 atm. The results are shown in Table 1.

EXAMPLE 4

This Example was carried out under the same conditions as shown in Example 1 (2) of Table 1 except that a polysilazane (i) wherein R$_1$, R$_2$ and R$_3$ each represent a methyl group and R represents dimethylsilyl, and having a number average molecular weight of 1,100 was used, to obtain a sintered body. The results are shown in Table 1.

EXAMPLE 5

This Example was carried out under the same conditions as shown in Example 1 (8) of Table 1 except that a polysilazane (iii) wherein R$_1$, R$_2$, R$_3$, R$_5$ and R$_6$ each represent dimethylsilyl group, and having a number average molecular weight of 1,300 was used. The results are shown in Table 1.

TABLE 1

| Example | No. | Al$_2$O$_3$ wt % | Polysilazane wt % | Calcination temp. °C | Crystalline phase | Density g/cc | Three-point flexural strength MPa Room temp. | Three-point flexural strength MPa 1200°C |
|---|---|---|---|---|---|---|---|---|
| 1 | 1 | 97.3 | 2.7 | 1750 | Al$_2$O$_3$ Si$_3$N$_4$ | 3.94 | 385 | 308 |
|  | 2 | 94.1 | 5.9 | 1750 | Al$_2$O$_3$ Si$_3$N$_4$ | 3.91 | 321 | 265 |
|  | 3 | 90.3 | 9.7 | 1750 | Al$_2$O$_3$ Si$_3$N$_4$ | 3.89 | 329 | 260 |
|  | 4 | 85.7 | 14.3 | 1750 | Al$_2$O$_3$ Si$_3$N$_4$ | 3.81 | 271 | 226 |
|  | 5 | 80.1 | 19.9 | 1750 | Al$_2$O$_3$ Si$_3$N$_4$ | 3.69 | 233 | 193 |
|  | 6 | 97.3 | 2.7 | 1600 | Al$_2$O$_3$ Si$_3$N$_4$ | 3.21 | 165 | 132 |
|  | 7 | 94.1 | 5.9 | 1600 | Al$_2$O$_3$ Si$_3$N$_4$ | 3.07 | 152 | 106 |
|  | 8 | 90.3 | 9.7 | 1600 | Al$_2$O$_3$ Si$_3$N$_4$ | 2.86 |  |  |
|  | 9 | 85.7 | 14.3 | 1600 | Al$_2$O$_3$ Si$_3$N$_4$ | 2.82 | 133 | 75 |
|  | 10 | 80.1 | 19.9 | 1600 | Al$_2$O$_3$ Si$_3$N$_4$ | 2.63 | 104 | 85 |
| 2 | 11 | 94.1 | 5.9 | 1750 | Al$_2$O$_3$ Si$_3$N$_4$ | 3.82 | 332 | 276 |
|  | 12 | 85.7 | 14.3 | 1600 | Al$_2$O$_3$ Si$_3$N$_4$ | 2.75 | 118 | 81 |
| 3 | 13 | 94.1 | 5.9 | 1750 | Al$_2$O$_3$ Si$_3$N$_4$ | 3.86 | 343 | 266 |
| 4 | 14 | 94.1 | 5.9 | 1750 | Al$_2$O$_3$ Si$_3$N$_4$ | 3.88 | 336 | 261 |
| 5 | 15 | 90.3 | 9.7 | 1600 | Al$_2$O$_3$ Si$_3$N$_4$ | 2.95 | 154 | 105 |

EXAMPLE 6

An alumina (AML-41, tradename of a product made by Sumitomo Denko Co., Ltd.) (106 g) was mixed with a polysilazane (ii) (18.6 g) and a mixed solution of toluene/acetone (50/50 vol.%) (100 g), followed by subjecting the mixture to supersonic dispersing for 30 min., and subjecting the resulting slurry to doctor blade molding to prepare a uniform sheet of 0.25 mm thick.

The temperature of this sheet was raised up to 500° C. in a nitrogen atmosphere under the atmospheric pressure and at a rate of 1C.°/min., followed by raising the temperature up to 700° C. at a rate of 3C.°/min., raising the temperature up to 1,100° C. at a rate of 15C.°/min., further raising the temperature up to 1,600° C. at a rate of 10° C./min. and raising the pressure up to 9.5 atm.

The temperature and the pressure were retained under this state for 2 hours, followed by natural cooling to obtain a sintered body having a density of 2.91.

EXAMPLE 7

An alumina (AML-41, tradename of a product made by Sumitomo Denko Co., Ltd.) (76.4% by weight) and magnesia (5.0% by weight) were melt-kneaded with a mixture of a polysilazane (ii) (18.2% by weight) and a paraffin wax (0.4% by weight) by means of a kneader to obtain a compound, followed by molding it according to injecting molding process into a columner body of 5 mm ×5 mm ×50 mm, raising the temperature up to 700° C. at a rate of 3C.°/min., further raising the temperature up to 1,100° C. at a rate of 15C.°/min. and calcining the resulting material in nitrogen gas under a pressure of 9.5 Kg/cm$^2$ to obtain a molded body having a flexural strength of 20.2 Kg/cm$^2$.

EXAMPLE 8

A molded body was prepared in the same manner as in Example 1, followed by calcining the body in a mixed gas of N$_2$/NH$_3$ (50/50%), under the atmospheric pressure at 1,200° C. at a rate of 1°C./min., taking out the resulting calcined body, raising the temperature from room temperature up to 1,200° C. and at a rate of 10° C./min. under the atmospheric pressure in the presence of nitrogen gas, further raising the temperature up to 1,700° C. under a pressure of 9.5 atm in the presence of nitrogen gas, retaining the temperature and the pressure each as indicated above for one hour and subjecting the resulting material to natural cooling to obtain a sintered body. This body exhibited a density (g/cc) of 3.72, a crystalline phase of Al$_2$O$_3$, Si$_3$N$_4$, a flexural strength at room temperature of 252 MPa and a flexural strength at 1,200° C. of 216 MPa.

What we claim is:

1. A novel ceramic composition obtained by sintering and molding a molded body consisting of 80.1 to 97.3%, by weight, of alumina powder and 2.7 to 19.9%, by weight, of a polysilazane which forms silicon nitride, silicon carbide, sialon or a mixture thereof in an atmosphere of nitrogen, argon and/or ammonia or under pressure, at a temperature of 800° to 1,950° C.

2. A novel ceramic composition according to claim 1, wherein said polysilizane is a polysilazane (i) having a core structure consisting of repetitive units of the formula

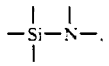

and comprises a plurality of the residual groups of the precursor of said polysilazane (i), having the formula

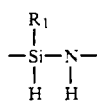

some of the residual groups forming part of a first structural unit of the formula

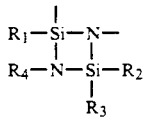

and some of the residual groups forming a second structural unit of the formula

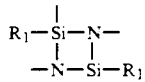

and these structural units being bonded to each other in said polysilazane (i),
wherein $R_1$, $R_2$, $R_3$ and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group, $R_1$, $R_2$, and $R_3$ each represent a hydrogen atom or a di-lower alkylamino group, and $R_1$, $R_2$, $R_3$ and $R_4$ may be the same or different.

3. A novel ceramic composition according to claim 1, wherein said polysilizane is a polysilazane (ii) having a core structure consisting of repetitive units of the formula

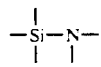

and comprises a plurality of the residual groups of the precursor of said polysilazane (iii) having the formula

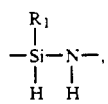

some of the residual groups of the precursor of said polysilazane (ii) consisting of the repetitive units of the formula

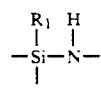

being bonded by a structural unit of the formula

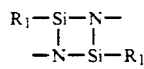

to each other, and
said precursor being composed of the units of the formula

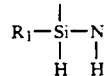

and the formula

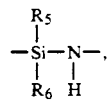

wherein said $R_1$, $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group or a di-lower alkylamino group, $R_1$ also represents hydrogen atom besides the above-mentioned groups, and $R_1$, $R_5$ and $R_6$ may be the same or different.

4. A novel ceramic composition according to claim 1, wherein said polysilazane in a polysilazane (iii) said polysilazane (iii) having a core structure consisting of repetitive units of the formula

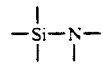

and comprises a plurality of the residual groups of the precursor of said polysilazane (iii) having the formula of repetitive units of the formula

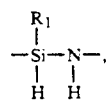

and some of the residual groups forming part of a first structural unit of the formula

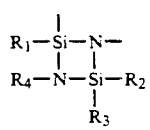

and some of the residual groups forming a second structural unit of the formula

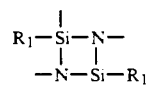

these structural units being bonded to each other in said polysilazane (iii), and further, said precursor being partly composed of units of the formula

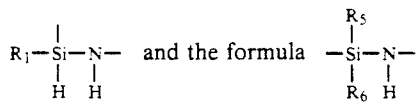

wherein $R_1$, $R_2$, $R_3$, and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group, $R_1$, $R_2$, and $R_3$ each represent a hydrogen atom or a di-lower alkylamino group and $R_1$, $R_2$, $R_3$ and $R_4$ may be the same or different; and $R_5$ and $R_6$ each represent a lower alkyl group 1 to 6 carbon atoms, a substituted or unsubstituted vinyl group, a substituted or unsubstituted allyl group, a substituted or unsubstituted lower aryl group of 6 to 10 carbon atoms, a tri-lower alkyl or di-lower alkylsilyl group or a di-lower alkylamino group, and $R_1$, $R_2$, $R_3$, and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group, $R_1$, $R_2$, and $R_3$ each represent a hydrogen atom or a di-lower alkylamino group and $R_1$, $R_2$, $R_3$ and $R_4$ may be the same or different; and $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl or di-lower alkylsilyl group or a di-lower alkylamino group, and $R_1$, $R_5$ and $R_6$ may be the same or different 5. A process for producing a ceramic composition, which comprises calcining a molded body composed of a major amount of alumina powder and a polysilazane (i) in an atmosphere of an inert gas of argon or nitrogen and/or ammonia or at an elevated pressure at a temperature of 800° to 1,950° C.

said polysilazane (i) having a core structure consisting of repetitive units of the formula

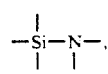

and comprises a plurality of the residual groups of the precursor of said polysilazane (i), having the formula

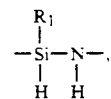

and some of the residual groups forming part of a first structural unit of the formula

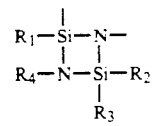

some of the residual groups forming a second structural unit of the formula

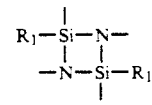

and these structural units being bonded to each other in said polysilazane (i), wherein $R_1$, $R_2$, and $R_3$ and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group, $R_1$, $R_2$, and $R_3$ each represent a hydrogen atom or a di-lower alkylamino group, and $R_1$, $R_2$, $R_3$ and $R_4$ may be the same or different.

6. A process according to claim 5, wherein said lower alkyl group is selected from among methyl group, ethyl group, n-propyl group and isopropyl group; said substituted or unsubstituted lower aryl group is selected from among phenyl group, tolyl group and xylyl groups; said tri- lower alkyl- or di- lower alkylsilyl group is selected from among trimethyl- , dimethyl-, methylethyl-and triethyl- sily groups; and said di- lower alkylamino group is selected from among dimethyl-, diethyl-, methylethyl- and diisopropyl- amino groups.

7. A process for producing a ceramic composition according to claim 5 wherein the concentration of alumina is 80.1-97.3%, by weight, and the concentration of said polysilazane is 2.7-19.9%, by weight.

8. A process for producing a ceramic composition, which comprises calcining a molded body composed of a major amount of alumina powder and a polysilazane (ii) in an atmosphere of an inert gas of argon or nitrogen and/or ammonia or at an elevated pressure at a temperature of 800° to 1,950° C.;

said polysilazane (ii) having a core structure consisting of repetitive units of the formula

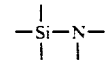

and includes a plurality of the residual groups of the precursor of said polysilazane (ii) consisting of the repetitive units of the formula

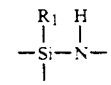

being bonded by a structural unit of the formula

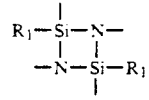

to each other, and
said precursor being composed of the units of the formula

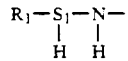

and the formula

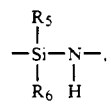

wherein said $R_1$, $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group of a di-lower alkylamino group, $R_1$ also represents a hydrogen atom besides the above-mentioned groups, and $R_1$, $R_5$ and $R_6$ may be the same or different.

9. A process according to claim 8, wherein said lower alkyl group is selected from among methyl group, ethyl group, n-propyl group and isopropyl group; said substituted or unsubstituted lower aryl group is selected from among phenyl group, tolyl group and xylyl groups; said tri-lower alkyl- or di-lower alkylsilyl group is selected from among trimethyl, dimethyl-, methylethyl-and triethyl- silyl groups; and said di-lower alkylamino group is selected from among dimethyl-, methylethyl- and diisopropyl-amino groups.

10. A process for producing a ceramic composition according to claim 8 wherein the concentration of alumina is 80.1–97.3%, by weight, and the concentration of said polysilazane is 2.7–19.9%, by weight.

11. A process for producing a ceramic composition, which comprises calcining a molded body composed of a major amount of alumina powder and a polysilazane (iii) in an atmosphere of an inert gas of argon or nitrogen and/or ammonia or at an elevated pressure at a temperature of 800° to 1,950° C.;
said polysilazane (iii) having a core structure consisting of repetitive units of the formula

and comprises a plurality of the residual groups of the precursor of said polysilazane (iii) having the formula

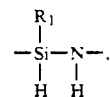

some of the residual groups forming part of a first structural unit of the formula

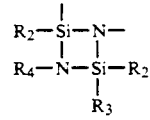

and some of the residual groups forming part of a first structural unit of the formula

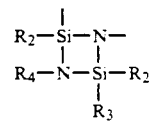

and some of the residual groups forming a second structural unit of the formula

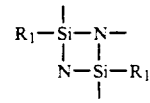

these structural units being bonded to each other in said polysilazane (iii), and further,
said precursor being partly composed of units of the formula

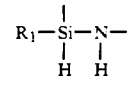

and the formula

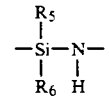

wherein $R_1$, $R_2$, $R_3$, and $R_4$, each represent a lower alkyl group of 1 to 7 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group, $R_1$, $R_2$, and $R_3$ each represent a hydrogen atom or a di-lower alkylamino group and $R_1$, $R_2$, $R_3$ and $R_4$ may be the same or different and $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl or di-lower alkylsilyl group or di-lower alkylamino group, and $R_5$ and $R_{67}$ may be the same or different 12. A process according to claim 11, wherein said lower alkyl group is selected from among a methyl group, ethyl group, n-propyl group and isopropyl group; said substituted or unsubstituted lower aryl group is selected from among phenyl group, tolyl group and xylyl groups; said tri- lower alkyl- or di- lower alkylsilyl group is selected from among trimethyl-, dimethyl-, methylethyl-and triethyl- silyl group; and said di- lower alkylamino group is selected from among dimethyl-, methylethyl- and diisopropyl- amino groups.

13. A process for producing a ceramic composition according to claim 11 wherein the concentration of alumina is 80.1-97.3%, by weight, and the concentration of said polysilazane is 2.7-19.9%, by weight.

14. A molding auxiliary for a novel ceramic composition comprising a polysilazane (i) which forms silicon nitride, silicon carbide, sialon or a mixture of the forgoing in an atmosphere of nitrogen and/or ammonia or under pressure and in a calcination atmosphere and 800° to 1,950°, said polysilazane (i) having a core structure consisting of repetitive units of the formula -Si-N-, and comprises a plurality of the residual groups of the precursor of said polysilazane (i), having the formula

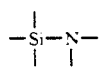

and some of the residual groups forming part of a first structural unit of the formula

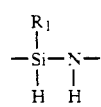

and some of the residual groups forming part of a first structural unit of the formula

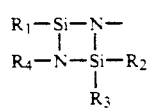

and some of the residual groups forming a second structural unit of the formula

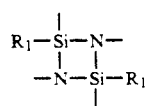

and these structural units being bonded to each other in said polysilazane (i),
and these structural units being bonded to each other in said polysilazane (i),
wherein $R_1, R_2, R_3$ and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri- lower alkyl- or di-lower alkylsilyl group, $R_1, R_2$, and $R_3$ each represent a hydrogen atom or a di- lower alkylamino group, and $R_1, R_2, R_3$ and $R_4$ may be the same or different.

15. A molding auxiliary for a novel ceramic composition comprising a polysilazane (ii) which forms silicon nitride, silicon carbide, sialon or a mixture of the forgoing in an atmosphere of nitrogen and/or ammonia or under pressure and ian a calcination atmosphere at 800° to 1,950° C., said polysilazane (ii) having a core structure consisting of repetitive units of the formula

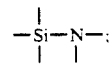

the residual groups of the precursor of said polysilazane (ii) consisting of the repetitive units of the formula

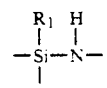

being bonded by a structural unit of the formula

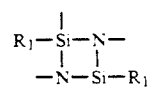

to each other, and
said precursor being composed of the units of the formula

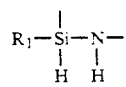

and the formula

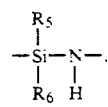

wherein said $R_1$, $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group or a di-lower alkylamino group, $R_1$ also represents hydrogen atom besides the above-mentioned groups, and $R_1$, $R_5$ and $R_6$ may be the same or different.

16. A molding auxiliary for a novel ceramic composition comprising a polysilazane (iii) which forms silicon nitride, silicon carbide, sialon or a mixture of the forgoing in an atmosphere of nitrogen and/or ammonia or under pressure and in a calcination atmosphere at 800° to 1,950° C., said polysilazane (iii) having a core structure consisting of repetitive units of the formula

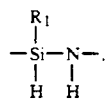

some of the residual groups forming part of a first structural unit of the formula

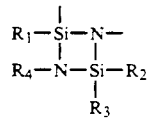

some of the residual groups forming a second structural unit of the formula

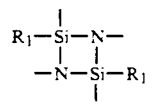

these structural units being bonded to each other in said polysilazane (iii), and further, said precursor being partly composed of units of the formula

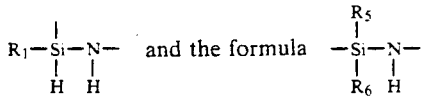

wherein $R_1$, $R_2$, $R_3$, and $R_4$, each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl- or di-lower alkylsilyl group, $R_1$, $R_2$, and $R_3$, each represent a hydrogen atom or a di-lower alkylamino group, and $R_1$, $R_2$, $R_3$ and $R_4$ may be the same or different; and $R_5$ and $R_6$ each represent a lower alkyl group of 1 to 6 carbon atoms, a substituted or unsubstituted vinyl group, a substituted or unsubstituted allyl group, a substituted or unsubstituted lower aryl group of 6 to 10 carbon atoms, a tri-lower alkyl or di-lower alkylsilyl group or a di-lower alkylamino group, and $R_5$ and $R_6$ may be the same or different.

* * * * *

UNITED STATES PATENT AND TRADEMARK OFFICE
CERTIFICATE OF CORRECTION

PATENT NO. : 5,196,387
DATED : March 23, 1993
INVENTOR(S) : Ayama et al.

It is certified that error appears in the above-identified patent and that said Letters Patent is hereby corrected as shown below: Title page, Item no. [75], Inventors, change "Kouichi Ayama, Minamata" to --Kouichi Ayama, Minamatashi--.

Claim 6, col. 14, line 38, change "sily" to --silyl--.

Claim 4, col. 12, line 32, change "in a" to --is a--.

Claim 11, col. 16, line 54, change "1 to 7" to --1 to 6--.

Claim 12, col. 17, line 8, change "group" to --groups--.

Claim 14, col. 17, line 20, after "1,950°" insert --C.--.

Claim 15, col. 18, line 7, change "ian" to --in a--.

Claim 16, col. 20, line 17, change "R$_3$ ,e ach" to --R$_3$ each--.

Signed and Sealed this

First Day of February, 1994

Attest:

BRUCE LEHMAN

Attesting Officer　　　Commissioner of Patents and Trademarks